UNITED STATES PATENT OFFICE.

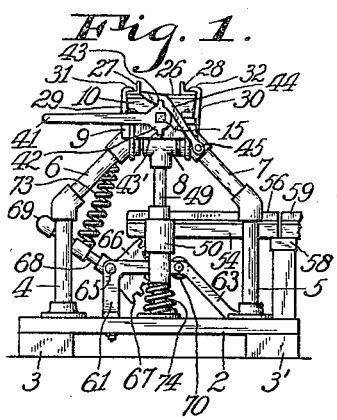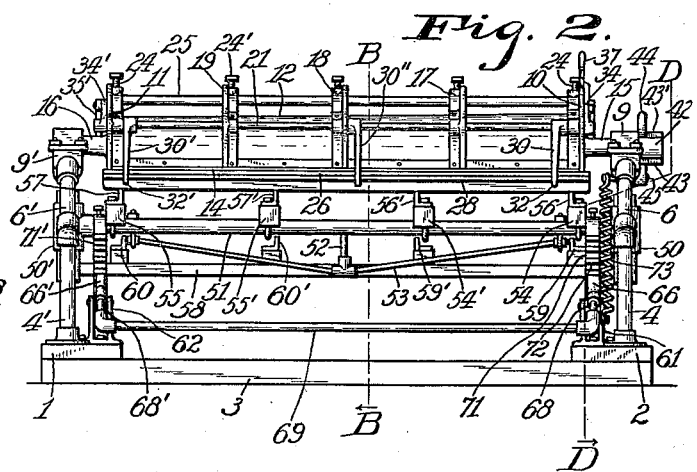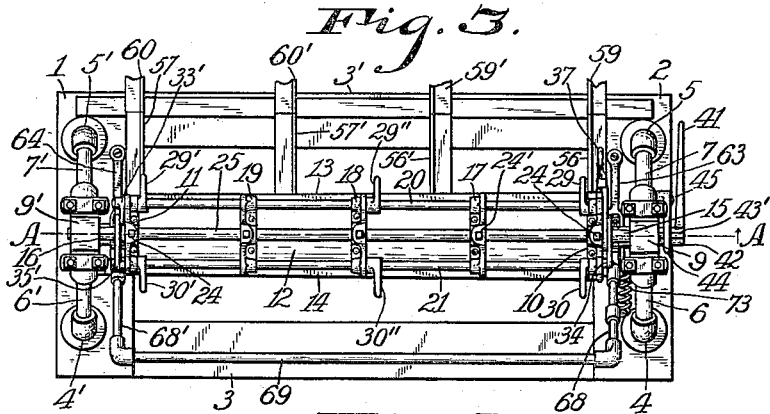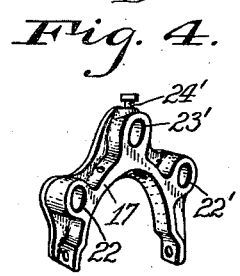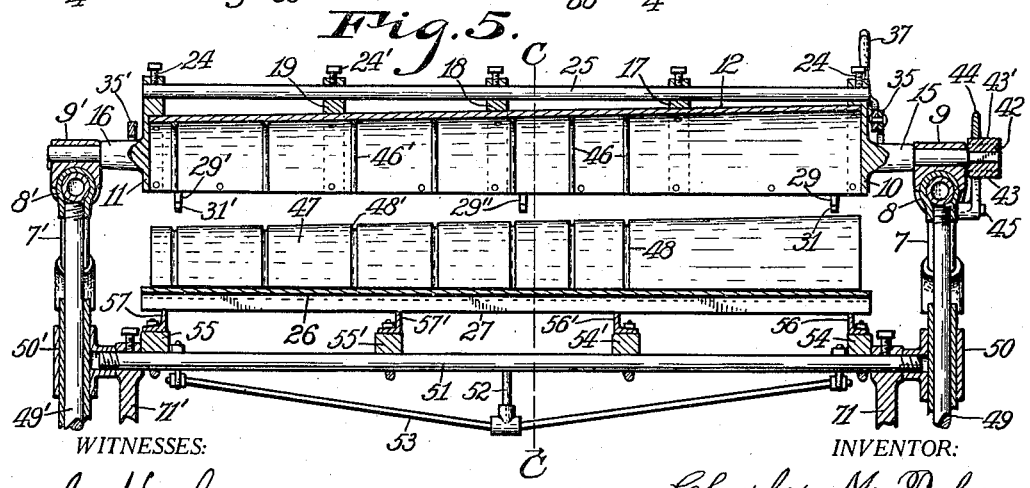

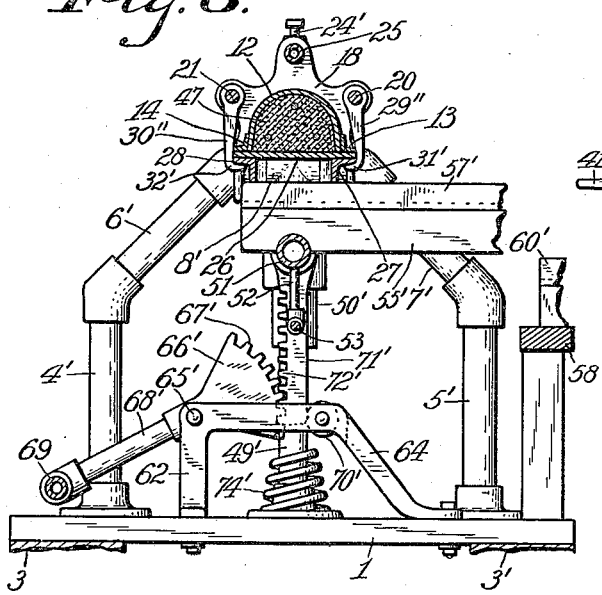

CHARLES M. DOLEN, OF MOORESVILLE, INDIANA.

CONCRETE-MOLDING MACHINE.

1,154,387.  Specification of Letters Patent.  Patented Sept. 21, 1915.

Application filed March 7, 1914. Serial No. 823,130.

*To all whom it may concern:*

Be it known that I, CHARLES M. DOLEN, a citizen of the United States, residing at Mooresville, in the county of Morgan and State of Indiana, have invented a new and useful Concrete-Molding Machine, of which the following is a specification, reference being had to the accompanying drawings, and to the letters and figures of reference marked thereon.

This invention relates to machines for molding plastic material or similar substances in the form that may be desired or required, such as a fence or other post, column, pillar, or various patterns of building blocks, the invention having reference more particularly to a concrete molding machine that is especially adapted for molding fence posts and delivering the posts from the mold.

An object of the invention is to provide an improved molding machine that shall be so constructed that posts or forms of blocks may be rapidly produced and conveniently delivered for curing or hardening with assurance of perfectness in quality of product.

Another object of the invention is to provide a machine of the above mentioned character that shall be especially adapted for molding fence posts efficiently and economically, and which may be conveniently operated by only one man if desired, and by which the operations may be expedited by the assistance of others.

A still further object of the invention is to provide a concrete molding machine of such construction as to permit the use of simple and inexpensive stock material in the manufacture of the machine, an object being to provide a light weight machine which shall be strong, durable, and economical in use.

Having the above mentioned and other objects in view, the invention consists in a molding machine comprising a frame largely composed of hollow material, a mold rotatably mounted on the frame and provided with means for temporarily securing a pallet to the mold to receive the product, and means for removing the product away from the mold, the invention consisting also in the novel parts and in the combinations and arrangement of parts as hereinafter particularly described and claimed.

Referring to the drawings, Figure 1 is an end elevation of the machine showing the mold covered as when ready for delivering a post therefrom onto a pallet; Fig. 2, a front elevation of the machine in which the mold is inverted so that the post may be removed therefrom; Fig. 3, a top plan of Fig. 2; Fig. 4, a perspective view of one of the parts of the mold; Fig. 5, a vertical section partially broken away approximately on the line A A in Fig. 3; Fig. 6, a transverse section on the line B B in Fig. 2; Fig. 7, a fragmentary section on the line C C in Fig. 5; Fig. 8, an elevation of one end of the mold; Fig. 9, a fragmentary section on the line D D in Fig. 2; Fig. 10, a perspective view of the controlling arm of the mold; Fig. 11, an elevation of the opposite end of the mold partially broken away; Fig. 12, a top plan of connected parts of the machine, and Fig. 13 is an end view of the improved pallet which is adapted to temporarily constitute a part of the machine.

Similar reference characters in the different figures of the drawings indicate corresponding elements or features of construction herein referred to.

In practically carrying out the objects of the invention, preferably two base timbers 1 and 2 are employed and they preferably are secured upon longer timbers 3 and 3' to constitute a firm support and permit the machine to be conveniently moved from place to place if desired, but in case it is desired to place the machine permanently in one position a shop floor may serve the purpose of the timbers, as will be obvious. Two hollow posts 4 and 5 are suitably secured upon the timber 2, two beams 6 and 7 being secured to the posts and extending convergently upward, the ends of the beams being secured to a cross-bar 8, all preferably being formed of pieces of iron pipe and pipe-fittings so as to be strong and light in weight and practically form an arch. A companion arch comprises legs 4' and 5' secured upon the base timber 1, inclined beams 6' and 7' and a cross-bar 8 being constructed as above described. Two journal boxes 9 and 9' are suitably secured upon the cross-bars 8 and 8' respectively for rotatably supporting the mold.

A novel post mold comprises two end members 10 and 11 and a shell or body portion 12 secured to the end members, the shell being approximately U-shaped in cross-section and horizontally arranged, and it is provided on the outer sides of the upper portion thereof with angle-iron stiffening bars 13 and 14 that extend from one to the other of the end members. The end members are substantially alike excepting as to dimensions, the member 10 for forming the lower end of the post being larger than the other and preferably arranged at the head end of the machine, the member being provided with a trunnion 15 rotatably supported in the box 9, the smaller member 11 for forming the top of the post being provided with a trunnion 16 that is mounted in the box 9'. The shell may suitably be composed of sheet metal and provided with stiffening yokes 17, 18 and 19 embracing the exterior of the shell and secured thereto, the yokes being substantially alike but differing slightly in dimensions so as to conform to the dimensions of the shell at different portions thereof, the shell being deeper at one end than at the opposite end so as to form a tapering post, the larger end of which is to be set into the ground. Two rock-shafts 20 and 21 are rotatably mounted in the end members and the yokes of the mold so as to extend along opposite sides of the shell, the end members and the yokes having suitable journal bearings 22 and 22' therein to receive the rock-shafts. The end members and the yokes preferably are also provided with apertures 23, 23', and set-screws 24, 24', the apertures receiving a stiffening bar or tube 25 which extends from one to the other of the end members opposite the under side of the shell and is suitably secured by the set-screws, so that the bar or tube coöperates with the yokes and the end members to form a truss for the mold, this however not being required in some cases when the machine is designed for molding relatively short blocks.

A suitable number of pallets are provided, each of which comprises a flat main portion 26 preferably composed of sheet metal, and two L-section angle-irons 27 and 28 secured to opposite edge portions of the plate which is of suitable dimension to cover the mold and form the front of the post which preferably has a plane surface, the pallet being placed in contact with the end members and the stiffening bars 13 and 14 after filling the mold.

In order to secure the pallet to the mold proper a suitable number of clamp arms 29, 29', 29'', are fixedly secured to the rock-shaft 20, similar arms 30, 30', 30'', being secured to the rock-shaft 21. The arms may be swung to opposite sides of the mold, the arms that are on the rock-shaft 20 having lugs 31, 31', thereon adapted to engage one edge portion of the pallet, the arms on the rock-shaft 21 having similar lugs 32, 32', adapted to engage the opposite edge portion of the pallet, so that the pallet is securely clamped to the normal upper side or top edges of the mold for retaining the pallet while the mold is turned over to inverted position. At the head end of the machine the rock-shafts 20 and 21 are provided respectively with controlling arms 33 and 34 which are connected together by means of a connecting rod 35, the opposite ends of the rock-shafts preferably being provided with arms 33' and 34' connected together by means of a rod 35', so as to move and control all of the clamp arms in unison. The end member 10 is provided with a pivot 36 to which a controlling lever 37 is connected, the lever being connected by means of a pivot 38 to the connecting rod 35 and thus is enabled to operate and control all the clamp arms. The lever is provided with a suitable latch 39 coöperating with a toothed quadrant 40 formed on the end member 10, so that the clamp arms may be securely held to prevent shifting of the pallet.

In order to control and operate the mold an arm 41 is provided which has a hub or boss 42 on one end which is suitably connected to the trunnion 15 and is provided with projections 43 and 43' on opposite sides thereof adapted to be engaged by a suitable dog 44 which is suitably designed to receive either one of the projections, the dog being mounted on a pivot 45 supported by the beam 7, so that the mold is held against rotation either when in normal or upright position or when inverted. The inner side of the shell 12 of the mold preferably has a suitable number of beads or ribs 46, 46', thereon so that the post 47 shall have grooves 48, 48', in the rounded surface thereof to receive wires whereby to secure wire fencing to the post.

In order to lower the molded post from the inverted mold, two vertical guide-bars 49 and 49' are provided which are secured to the cross-bars 8 and 8' respectively and extend downward to and are secured upon the base timbers 1 and 2 respectively, or the shop floor, two slides 50 and 50' being movably guided on the guide-bars and secured to a beam 51, which may be hollow, the beam being preferably provided with a truss comprising a brace 52 and a truss rod 53, the latter being secured at its ends to the beam and having its middle portion seated on the brace. The beam is provided with a suitable number of cross-bars 54, 54', 55, 55', secured upon the upper side thereof and preferably provided with track rails 56, 56', 57, 57', a suitable trestle 58 preferably being supported at the rear of the machine and adapted to assist in supporting the load on the track rails, which preferably are sufficiently long to extend to the trestle and rest thereon when the beam is lowered. The trestle may support tracks 59, 59', 60, and 60' arranged so as to form continuations of the track rails on the beam 51. The beam 51 and the track rails thereon constitute a vertically adjustable skeleton table upon which the pallet and its load is lowered to be moved away clear of the mold, and in order to control the table two stands 61 and 62 are provided which are secured upon the base timbers 2 and 1 respectively, the stands being provided with braces 63 and 64 respectively and also pivots 65 and 65′ respectively on which gear segments 66 and 66′ are respectively mounted and provided with gear teeth 67 and 67′ respectively, the segments being provided with operating arms 68 and 68′ respectively to which a cross bar 69 is secured so as to form a foot lever or treadle. Two rollers 70 and 70′ are mounted in the stands opposite to and at suitable distance from the teeth of the segments. Two rack-bars 71 and 71′ are secured to the end portions of the beam 51 and extend downward between the rack-bars and the rollers, being provided with gear teeth 72 and 72′ that mesh with the teeth 67 and 67′ respectively, the arrangement being such as to enable the treadle when moved down to elevate and support the table.

The weight may be suitably distributed so that the table shall normally stand in lowered position, but in some cases this may be effected by means of a coil spring 73 connected to the arm 68 and also to the inclined beam 6 so as to draw the treadle upward, the spring however being superfluous when a post is on the table. In order to prevent jarring of the post when the table is lowered, two springs 74 and 74′ are provided which preferably are placed on the guide-bars 49 and 49′ and supported by the bases thereof or the base timbers and in such position to serve as cushions for the slides 50 and 50′ when they descend.

It should be understood that various modifications as to details of construction may fairly be made within the scope of the appended claims, it being obvious that, for instance, a hand wheel would be an equivalent of the controlling arm or lever 41 whereby to rotate the mold in its frame, various forms of latches obviously being permitted for holding the mold in the required position.

In practical use the mold is brought to normal position as shown in Fig. 1 and uncovered, the clamp arms being spread apart after which the mold is filled with suitable substance such as concrete or cement composition, including the usual reinforcing wires or rods, the surplusage being struck off, after which the pallet is placed in the proper position, and if moved slightly a few times serves to trowel the face of the post. The lever 37 should be moved so as to bring the clamp arms to proper position so that the lugs thereon engage the pallet, the lever being properly latched after the required adjustment. If the material used is quick-setting so that the mold is not required to rest while the setting takes place, the mold may at once be turned over and inverted as shown in the drawings, the clamp arms preventing the post from falling out of the mold, after which the table is elevated until it reaches the pallet which is then released by the operation of the lever 37, and the table may be then lowered which lowers the molded post from the post mold. The post and the pallet are shifted along the table toward the rear of the machine and thence onto the rails supported by the trestle if these are provided, or in their absence the attendants may carry the post away on the pallet to a suitable place where the post may become hardened sufficiently to be removed from the pallet, the latter being repeatedly used in the operations.

Having thus described the invention, what is claimed as new is—

1. A molding machine including a mold comprising a long and relatively narrow shell, two end members secured to the opposite ends respectively of the shell, a plurality of yokes secured to the exterior of the shell between the end members, and a hollow stiffening bar secured to the end members and also to all the yokes opposite the normal under side of the shell.

2. A molding machine including a long and relatively narrow mold having an open top, a pallet on the mold closing the top, two rock-shafts rotatably mounted on the exterior of the longer opposite sides respectively of the mold, and two series of clamp arms fixedly secured to the rock-shafts, a series to each, each arm having a lug thereon for engaging the pallet.

3. A molding machine including a long and relatively narrow mold having an open top, a pallet on the mold closing the top, two rock-shafts rotatably mounted on the exterior of the two longer opposite sides respectively of the mold, two series of clamp arms fixedly secured to the rock-shafts, a series to each and adapted to engage the pallet, and means for connecting the rock-shafts together for simultaneously turning them in opposite directions.

4. In a molding machine, the combination of two frame arches having each a central vertical guide bar fixedly secured to and extending downward from the arch, a mold rotatably supported upon the arches above the guide bars, a table having two slides that embrace and are movably guided by the bars respectively, two rack-bars connected to the table adjacent to the slides, two gear segments pivotally supported and engaging the rack-bars respectively, each segment having an operating arm, and a horizontally arranged foot-bar connected to the ends of the two operating arms.

5. In a molding machine, the combination of two frame members, two journal boxes mounted upon said members respectively, a mold having two end members, two trunnions fixed to the end members respectively and rotatively mounted in said boxes respectively, a controlling arm having a hub that is fixedly connected to one of said trunnions, the hub having two projections on opposite sides thereof respectively, and a dog connected to one of said frame members and adapted to be moved to separately engage said projections.

6. In a molding machine, the combination of two frame members, a mold rotatively supported upon the members, two guide bars vertically supported below the axis of rotation of the mold and adjacent to the frame members respectively, two stands supported adjacent to the guide bars respectively and having each a guide roller, a beam having two slides embracing and movably guided on said bars respectively, a plurality of tracks secured upon said beam, two rack-bars connected to said beam adjacent to the slides and guided by said rollers respectively, and a treadle comprising a horizontal foot bar and also two arms that are pivotally supported on said stands and having two gear segments thereon engaging said rack-bars respectively.

7. In a molding machine, the combination of a trough-like mold comprising a sheet metal body part and two end members secured to the opposite ends respectively of the body part, one end member having a quadrant fixed thereon, a plurality of yokes secured to the outer side of the body part, two rock-shafts rotatively mounted in the end members and the yokes on opposite sides respectively of the mold, each rock-shaft having an arm on each end thereof, a rod connected to an arm of each of said rock-shafts, a lever pivotally connected to said one of the end members and to said rod, a latch on said lever adapted for engagement with said quadrant, a rod connected to the remaining arms of said rock-shafts, two series of clamp arms secured to said rock-shafts, a series to each, and a pallet adapted to be seated on said mold and to be engaged by all of said clamp arms.

In testimony whereof, I affix my signature in presence of two witnesses.

CHAS. M. DOLEN.

Witnesses:
  GEO. R. SCRUGGS,
  EVERARD F. DOOLEY.

Copies of this patent may be obtained for five cents each, by addressing the "Commissioner of Patents, Washington, D. C."